United States Patent

Schaefer et al.

[11] Patent Number: 5,193,889
[45] Date of Patent: Mar. 16, 1993

[54] ANTILOCKING CONTROLLER OR DRIVE SLIP CONTROLLER

[75] Inventors: Jochen Schaefer, Bietigheim-Bissingen; Günter Dzierzawa, Waiblingen-Hegnach; Thomas Sauter, Remseck, all of Fed. Rep. of Germany

[73] Assignee: Robert Bosch GmbH, Stuttgart, Fed. Rep. of Germany

[21] Appl. No.: 773,612

[22] PCT Filed: May 11, 1990

[86] PCT No.: PCT/EP90/00759
§ 371 Date: Nov. 13, 1991
§ 102(e) Date: Nov. 13, 1991

[87] PCT Pub. No.: WO90/14256
PCT Pub. Date: Nov. 29, 1990

[30] Foreign Application Priority Data
May 17, 1989 [DE] Fed. Rep. of Germany ....... 3916046

[51] Int. Cl.⁵ .................... B60T 8/32; B60K 28/16; G01P 3/48
[52] U.S. Cl. .................................. 303/100; 303/103; 303/96

[58] Field of Search ............ 303/100, 102, 103, 95–98, 303/105, 106, 107, 108, 109, 110, 91; 364/426.01, 426.02, 426.03; 188/181 A, 181 C; 180/197

[56] References Cited

U.S. PATENT DOCUMENTS

| | | | |
|---|---|---|---|
| 3,630,578 | 12/1971 | Kaiser | 303/100 |
| 4,039,227 | 8/1977 | Sivulka | 303/91 X |
| 4,497,026 | 1/1985 | Braschel et al. | 303/105 X |
| 4,701,855 | 10/1987 | Fennel | 303/97 |
| 4,762,375 | 8/1988 | Maki et al. | 303/96 |
| 4,870,582 | 9/1989 | Hoashi et al. | 303/105 X |
| 4,992,945 | 2/1991 | Kumpfmueller | 303/103 X |
| 5,040,120 | 8/1991 | Hoffmann | 303/103 X |
| 5,099,443 | 3/1992 | Higashima et al. | 303/103 X |

FOREIGN PATENT DOCUMENTS

| | | |
|---|---|---|
| 2518190 | 11/1976 | Fed. Rep. of Germany . |
| 3644262 | 7/1987 | Fed. Rep. of Germany . |
| 3709158 | 10/1987 | Fed. Rep. of Germany . |
| 1543339 | 4/1979 | United Kingdom . |
| 8202862 | 9/1982 | World Int. Prop. O. . |

Primary Examiner—Douglas C. Butler
Attorney, Agent, or Firm—Felfe & Lynch

[57] ABSTRACT

An ABS or ARS is described in which additional facilities are provided for the detection of wheel vibrations. When a vibration is detected, actions for their suppression are initiated.

12 Claims, 3 Drawing Sheets

5,193,889

ANTILOCKING CONTROLLER OR DRIVE SLIP CONTROLLER

BACKGROUND OF THE INVENTION

From the DE-OS 25 18 190, a method is known by which to avoid wheel vibration in an ABS by preventing another pressure build-up for a predetermined period, after a pressure degradation and subsequent phase of holding a constant condition in which the wheel once more gains speed. This enables wheel vibrations to be prevented, but restricts the function of the controller which can no longer react as fast with this design.

From the EP-PS 00 73 198, a method is known in an ABS by which the wheel speed signal, in respect of physcially impossible changes, is filtered.

SUMMARY OF THE INVENTION

In the controller designed in accordance with the invention, no continuously effective method influences the controller function. Instead, a checking facility is provided to ascertain whether wheel vibration exists, and corrective action is initiated only when such vibration has been recognized. A corrective measure in an ASR, for example, is to influence the engine torque. However, it is also possible to intervene in the brake pressure variation, and this certainly applies to the ABS. It is possible to vary the duration of the control cycle, a required pressure build-up can be suppressed, and by a phase-shift, a pressure build-up or pressure holding can be initiated.

Several thresholds can be provided for triggering various actions for vibration suppression.

DETAILED DESCRIPTION OF THE PREFERRED EMBODIMENTS

Figure 1:
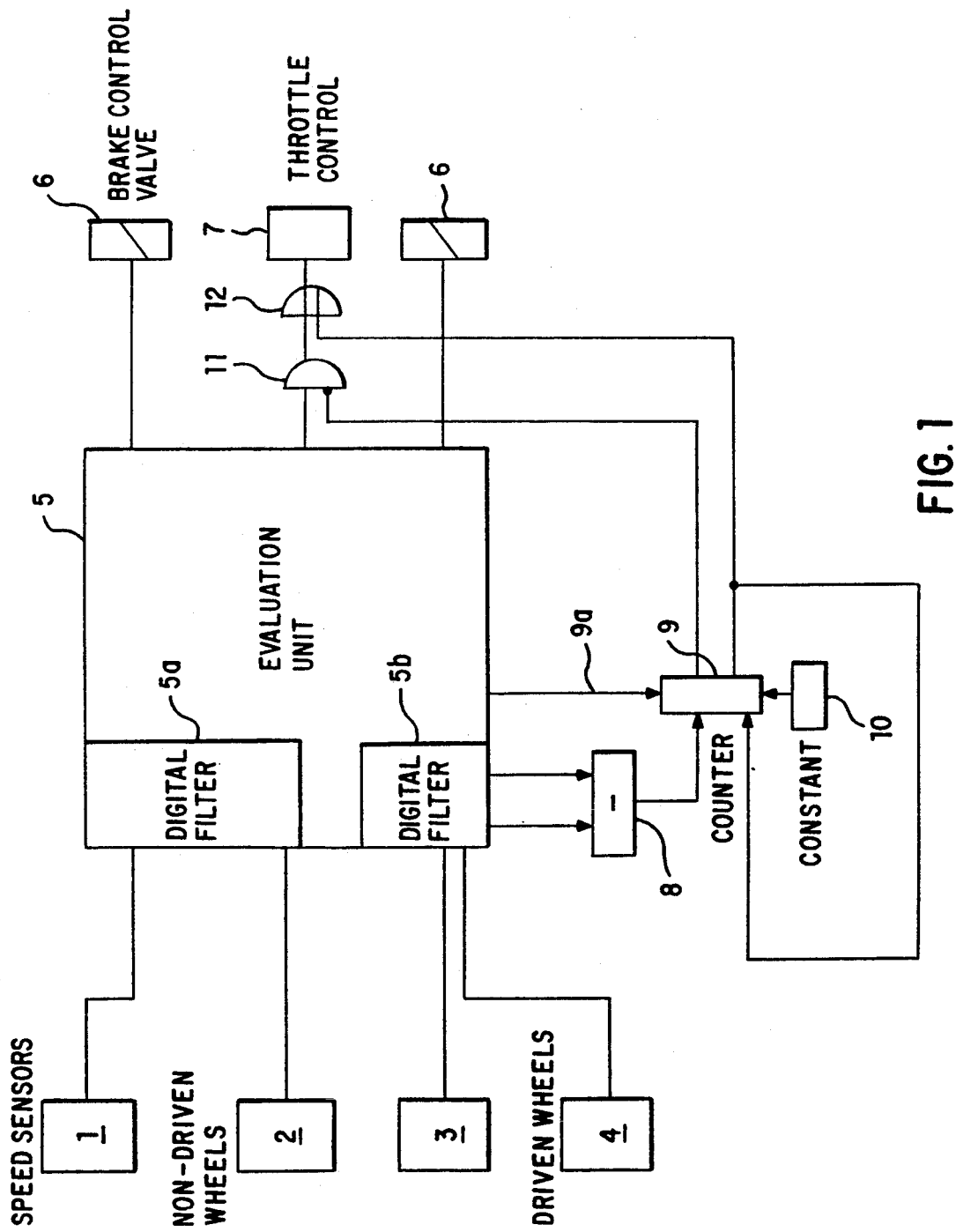
FIG. 1 shows a block diagram of an ASR

In FIG. 1, four transducers 1, 2 for the non-driven wheels and transducers 3, 4 for the driven wheels supply digital speed signals to an evaluation unit 5 which is designed as a microprocessor. This contains, in a known manner, filters 5a, 5b for the digital filtering of the wheel speed signals of the non-driven and driven wheels. In a known manner, the evaluation circuit produces control signals for brake control valves 6 which is assigned to the driven wheels, and for a control element 7 which can adjust the throttle.

In order to recognize wheel vibrations, a subtraction element 8 is provided which is supplied with the filtered ($V_{RF}$) and the unfiltered speed signal ($V_R$) of a driven wheel and which sends out a signal which corresponds to the difference of the two signals: $|V_R - V_{RF}|$. This signal is fed to a counter 9 which adds the differences generated in the time interval of the working cycle (control line 9a) of the evaluation circuit 5. With each cycle, the counter 9 is fed with a constant value from a block 10 which is substracted from the sum in counter 9. This value is rated such that with a small difference of the two speed signals, the counter is corrected downwards. If a first threshold is exceeded by the calculation result E of the counter 9, then a first control signal is produced which prevents the further supply of a control signal to a control element 7 (AND-gate 11).

If yet another threshold is exceeded, then a second control signal is coupled in via an OR-gate 12, which influences the control element so as to close the throttle. At the same time, the counter 9 is returned to the starting position. Moreover, resetting to a definite value or reduction by a definite amount would be possible.

Figure 2:
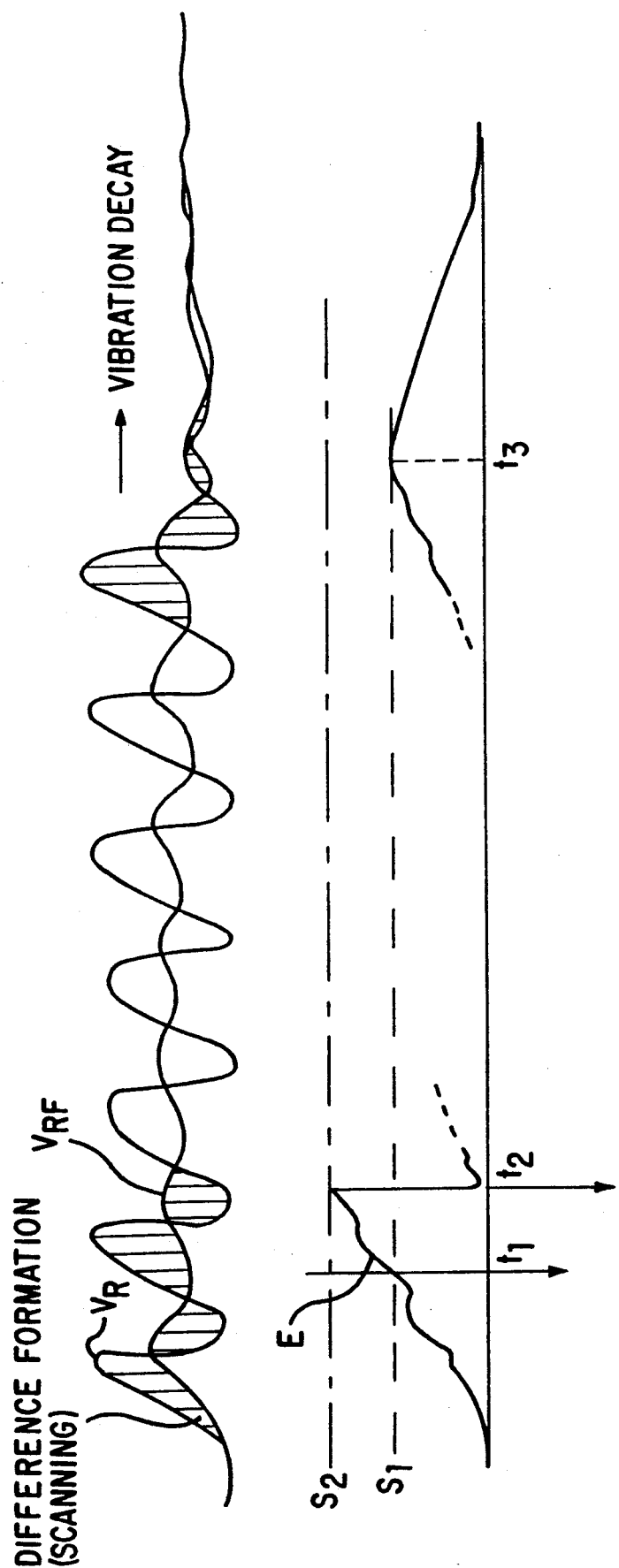
FIG. 2 shows an associated diagram

FIG. 2 shows the unfiltered wheel speed $V_R$ and the filtered wheel speed $V_{RF}$ over the time period. The differences are shown partly as a dashed line. Below this, the result E of the calculating process of the counter 9 is presented. At $t_1$, the first threshold $S_1$ is exceeded and further movement of the throttle is prevented. At $t_2$, the second threshold $S_2$ is exceeded and the throttle is angled back, and the counter is cleared.

After a few such processes, the vibration decays in the vicinity of $t_3$. For the other driven wheel, a second arrangement, which is not shown, is provided.

Figure 3:
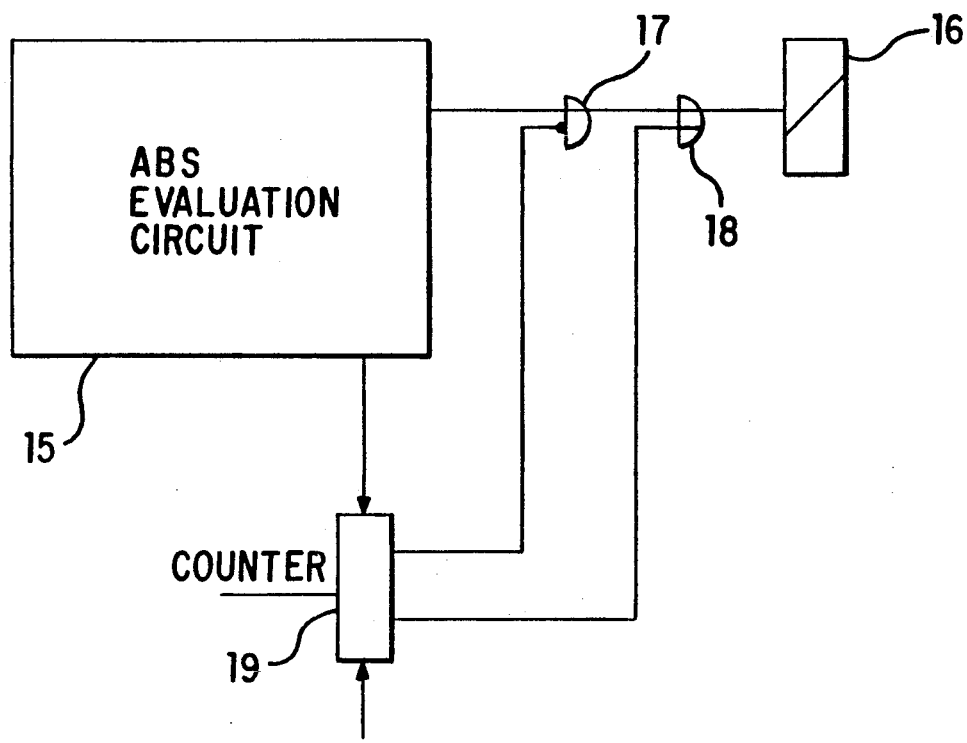
FIG. 3 shows a block diagram of another embodiment

In FIG. 3, item 15 is an evaluation circuit of an ABS; only one valve 16, associated with a vehicle wheel, is provided. In the event of a wheel vibration, further actuation of the valve 16 (AND-gate 17) is suppressed on reaching the first threshold, and on reaching the second threshold, the pressure is degraded/built up (OR-gate 18), depending on the condition of the other wheels.

According to a further development of the invention, the described arrangement is provided both on the driving wheels and on the non-driven wheels. This has the advantage that wheel vibrations which occur due to bad roads can be filtered out (i.e. the controller will not be affected), so that the result $E_N$ from the counter of the non-driven wheels is subtracted, perhaps weighted, from the result $E_D$ of the counter of the driven wheels. The counter is not influenced in the direction of a homogeneous friction value in which the non-driven wheels run "normally".

Figure 4:
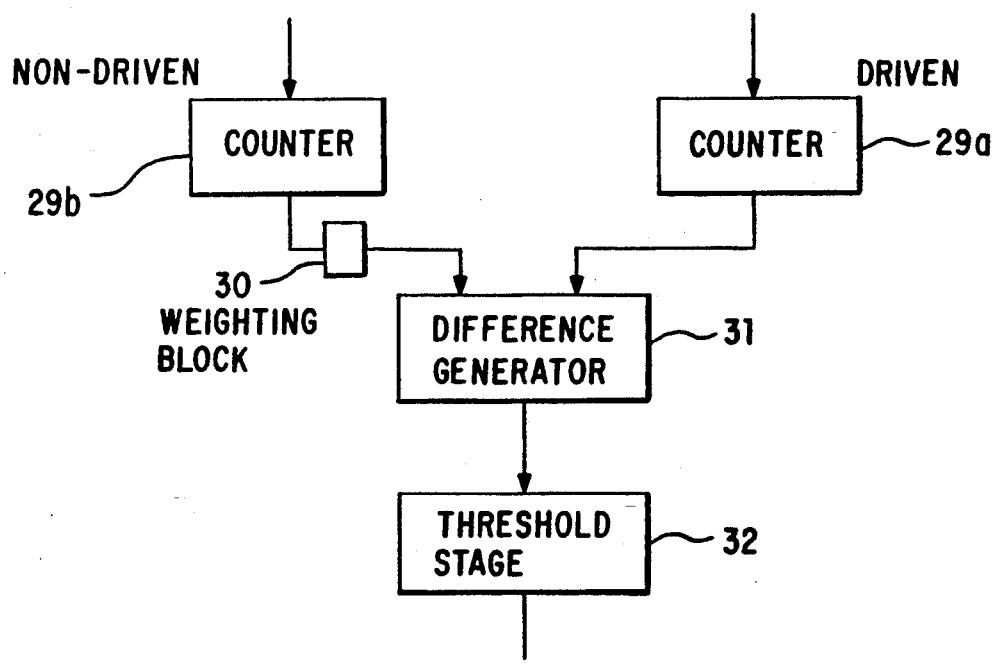
FIG. 4 is a block diagram of an embodiment for damping vibrations of driven and non-driven wheels

This is shown in FIG. 4, where 29a represents a counter (corresponding to 9 in FIG. 1) which is allocated to a driven wheel, 29b represents a counter allocated to a non-driven wheel, 30 is a weighting block, and 31 is a difference generator. This generates the difference of the counter results from counters 29a and the counter result—weighted with 0.9, for example—from the counter 29b. The difference is then fed to the threshold stage 32 which, when the predetermined threshold value is reached by the difference, gives a signal to influence the engine torque. In the event of a bad stretch of road, the intervention will not respond due to the difference being formed.

We claim:

1. Control system for reducing wheel slippage in a vehicle having wheels, each wheel having a speed, said system comprising
    means for measuring the speed of at least one wheel and producing a corresponding digital wheel speed signal $V_R$,
    means for digitally filtering said digital wheel speed signal $V_R$ to produce a filtered wheel speed signal $V_{RF}$,
    means for taking the difference $|V_R - V_{RF}|$ of the two speed signals over time,
    means for adding the differences $|V_R - V_{RF}|$ generated over time to produce a sum and substracting a fixed value from said sum each time a difference $|V_R - V_{RF}|$ is added, thereby producing a calculation result E, means for producing a first signal indicative of wheel vibration when said result E exceeds a first threshold, and means responsive to said first signal for taking a first action for suppressing said vibration.

2. Control system as in claim 1 for a said vehicle equipped with ASR, wherein said means responsive to said first signal comprises means for controlling engine power.

3. Control system as in claim 1 further comprising means for producing a second signal when said result E exceeds a second threshold greater than said first threshold, and means responsive to said second signal for taking a second action for suppressing said vibration.

4. Control system as in claim 3 for a said vehicle equipped with ASR, said means responsive to said first signal comprising means for holding engine power constant, said means responsive to said second signal comprising means for reducing engine power.

5. Control system as in claim 1 wherein said means responsive to said first signal comprises means for controlling brake pressure.

6. Control system for reducing wheel slippage in a vehicle having driven and non-driven wheels, each wheel having a speed, said system comprising means for measuring the speed of at least one driven wheel and at least one non-driven wheel to produce corresponding digital wheel speed signals $V_{RD}$ and $V_{RN}$, means for digitally filtering said signals $V_{RD}$ and $V_{RN}$ to produce corresponding filtered wheel speed signals $V_{RDF}$ and $V_{RNF}$, means for adding the differences $|V_{RD} - V_{RDF}|$ over time to produce a sum and subtracting a fixed value from said sum each time a difference $|V_{RD} - V_{RDF}|$ is added, thereby producing a calculation result $E_D$, means for adding the differences $|V_{RN} - V_{RNF}|$ over time to produce a sum and subtracting a fixed value from said sum each time a difference $|V_{RN} - V_{RNF}|$ is added, thereby producing a calculation result $E_N$, means for taking the difference $E_D - E_N$, means for producing a signal indicative of wheel vibration when the difference $E_D - E_N$ exceeds a threshold, and means responsive to said signal for taking action for suppressing vibration.

7. Control system as in claim 6 further comprising means for weighing at least one of said results $E_D$ and $E_N$ prior to taking the difference $E_D - E_N$.

8. Method for reducing wheel slippage in a vehicle having wheels, each wheel having a speed, said system comprising measuring the speed of at least one wheel and producing a corresponding digital wheel speed signal $V_R$, digitally filtering said digital wheel speed signal $V_R$ to produce a filtered wheel speed signal $V_{RF}$, taking the difference $|V_R - V_{RF}|$ of the two speed signals over time, adding the differences $|V_R - V_{RF}|$ generated over time to produce a sum and subtracting a fixed value from said sum each time the difference $|V_R - V_{RF}|$ is added, thereby producing a calculation result E, producing a first signal indicative of wheel vibration when said result E exceeds a first threshold, and taking a first action for suppressing said vibration in response to said first signal.

9. Method as in claim 8 for controlling drive slippage in a said vehicle equipped with ASR, said first action comprising controlling engine power.

10. Method as in claim 9 for controlling drive slippage in a said vehicle equipped with ASR, said first action comprising holding engine power constant, said second action comprising reducing engine power.

11. Method as in claim 8 further comprising producing a second signal when said result E exceeds a second threshold greater than said first threshold, and taking a second action for suppressing said vibration in response to said second signal.

12. Method as in claim 8 wherein said first action comprises controlling brake pressure.

* * * * *